United States Patent [19]

Harries

[11] 4,232,520
[45] Nov. 11, 1980

[54] ACTUATOR ASSEMBLIES FOR VEHICLE HYDRAULIC BRAKING SYSTEMS

[75] Inventor: David A. Harries, Solihull, England

[73] Assignee: Girling Limited, Birmingham, England

[21] Appl. No.: 13,200

[22] Filed: Feb. 16, 1979

Related U.S. Application Data

[63] Continuation of Ser. No. 793,891, May 4, 1977, abandoned.

[30] Foreign Application Priority Data

May 6, 1976 [GB] United Kingdom ............... 18516/76

[51] Int. Cl.³ ............................................. B60T 13/20
[52] U.S. Cl. ....................................... 60/550; 60/551; 60/553; 60/568; 60/581; 60/582
[58] Field of Search ..................... 60/547 R, 548, 550, 60/551, 552, 553, 554, 581, 594, 568, 582; 91/391 R

[56] References Cited

U.S. PATENT DOCUMENTS

| 2,820,345 | 1/1958 | Stelzer | 60/550 |
| 3,074,383 | 1/1963 | Schultz | 60/550 |
| 3,283,505 | 11/1966 | Julow | 60/552 |
| 3,306,043 | 2/1967 | Kellogg | 91/391 R |
| 4,015,881 | 4/1977 | Adachi | 60/551 |

FOREIGN PATENT DOCUMENTS

| 1016036 | 1/1966 | United Kingdom | 60/547 |
| 1345951 | 2/1974 | United Kingdom | 60/547 |
| 1451314 | 9/1976 | United Kingdom . | |
| 1451315 | 9/1976 | United Kingdom . | |

Primary Examiner—Abraham Hershkovitz
Attorney, Agent, or Firm—Scrivener, Parker, Scrivener and Clarke

[57] ABSTRACT

A power operated actuator assembly incorporates a stop mechanism for opposing movement of an actuating member if a booster fluid supply is operative. The stop mechanism comprises a chamber which is supplied with a metered proportion of pressurized fluid when the actuating member is moved such that the greater the force on the actuating member, the greater will be the magnitude of the force due to the pressurized fluid opposing movement of the actuating member.

6 Claims, 4 Drawing Figures

ACTUATOR ASSEMBLIES FOR VEHICLE HYDRAULIC BRAKING SYSTEMS

This is a continuation of application Ser. No. 793,891, filed May 4, 1977 now abandoned.

SPECIFIC DESCRIPTION

This invention relates to power-operated actuator assemblies for vehicle hydraulic braking systems of the kind comprising a piston for controlling the generation of pressure in a pressure space in a housing, an outlet port in the housing through which the pressure space can be connected to a wheel brake, a power chamber in the housing to which a supply of booster fluid is admitted to operate the piston, a booster valve assembly for controlling the supply of booster fluid to the power chamber, the booster valve assembly including a pedal-operated valve actuating member for applying an applying force manually to the piston in the event of a failure in the supply of booster fluid, and pressure responsive stop means in the housing for preventing the valve actuating member from being advanced through a distance sufficient to transmit a force to the piston at least when the supply of booster fluid is operative.

In British Pat. No. 1 451 315 divided from 1 451 314 we have disclosed a unit in which the stop means comprises a stop member which is movably mounted in the housing and which is exposed to the full pressure of the supply of booster fluid at least when the supply is operative. This means that the stop member must be sufficiently large to withstand the maximum brake-applying force which can be applied from the pedal. This is very seldom attained since, for most brake applications, the brake-applying force is relatively light. Thus, the unit described in British Pat. No. 1 451 315 is bigger, heavier and therefore more expensive than is generally necessary to cater for the magnitude of brake-applying forces usually encountered.

According to our invention in a power-operated actuator assembly of the kind set forth the housing is provided with a pair of first and second sealingly isolated chambers, of which the first is connected to a supply of fluid under pressure, and the booster valve assembly includes a normally open exhaust valve connecting the second chamber to a reservoir for fluid and a normally closed inlet valve providing connection between the two chambers operation of the actuating member in an operating direction closing the exhaust valve to isolate the second chamber from the reservoir and opening the inlet valve to supply a metered proportion of the fluid under pressure to the second chamber to act as the stop means and oppose movement of the actuating member in the said operating direction.

Thus the greater the input force on the actuating member, the greater will be the magnitude of the force opposing the movement of the actuating member and, when the inlet valve is fully opened, the force is dependent upon the total pressure of the supply of fluid.

The housing may be divided into two portions by means of a member which is separate from the housing and which is movable in the housing to allow communication between the portions and relieve any pressure which may be trapped in a chamber upon failure of the supply of fluid under pressure, thereby ensuring that movement of the actuating member to operate the piston mechanically is not impeded, although the exhaust valve may be closed.

Conveniently the member comprises a piston of stepped outline located in a stepped bore in the housing with a portion of the piston which is of smaller area working in a bore portion of smaller area, and the portion of the piston which is of greater area being a clearance fit in the bore portion of greater area but normally having a sealing engagement with a wall at the end of the bore through which the actuating member projects and is a working fit in a blind axial bore in the piston, the first chamber comprising a first compartment between the piston and the bore portion of greater area in permanent connection with a second compartment defined between the inner end of the blind bore and the inlet valve, and the second chamber comprising a third compartment defined in the blind bore between the inlet valve and the exhaust valve and a fourth compartment between the stepped piston and the closed inner end of the stepped bore and with which the third compartment is in permanent communication.

One embodiment of our invention is illustrated in the accompanying drawings in which.

Figure 1:
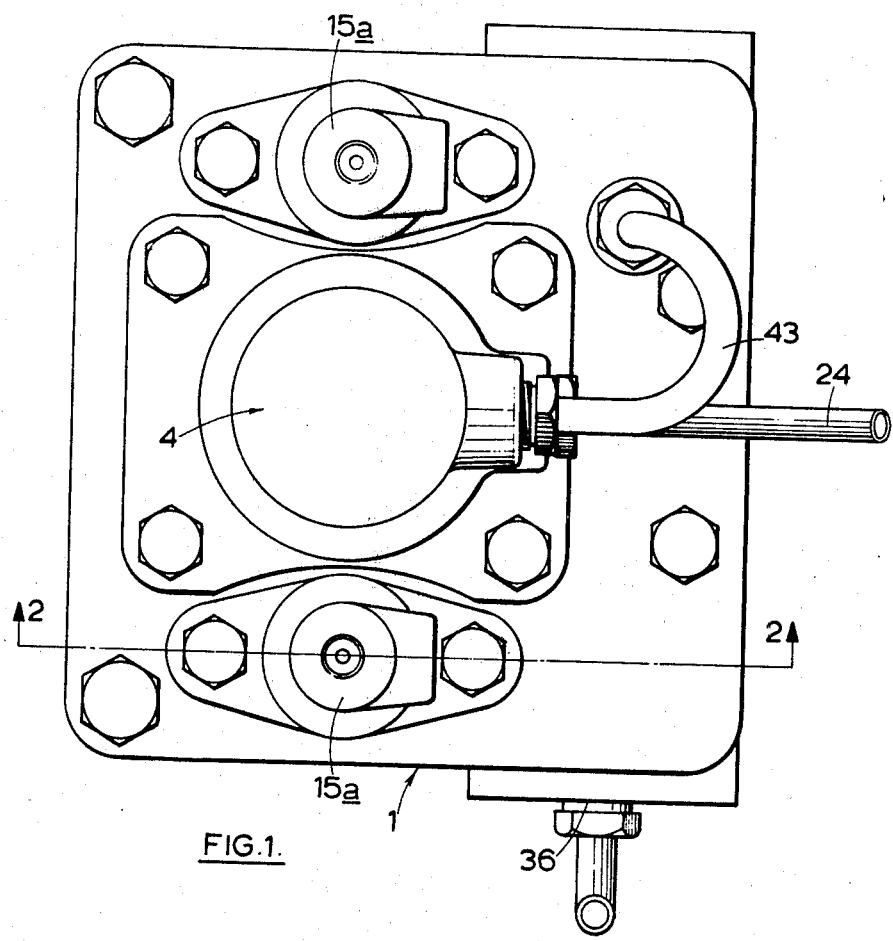
FIG. 1 is an end elevation of a power-operated actuator assembly for a vehicle hydraulic braking system.
Figure 2:
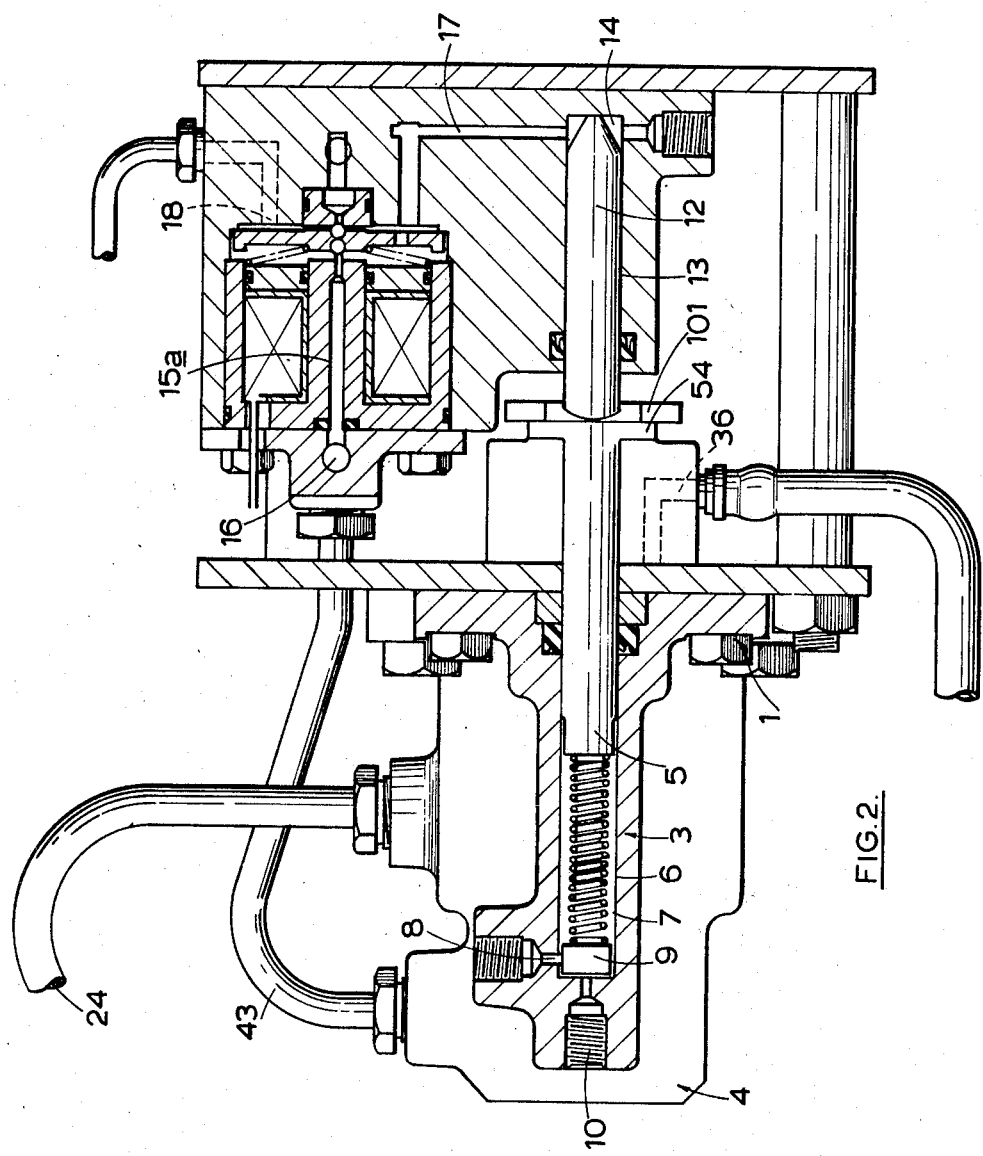
FIG. 2 is a section on the line 2—2 of FIG. 1.
Figure 3:
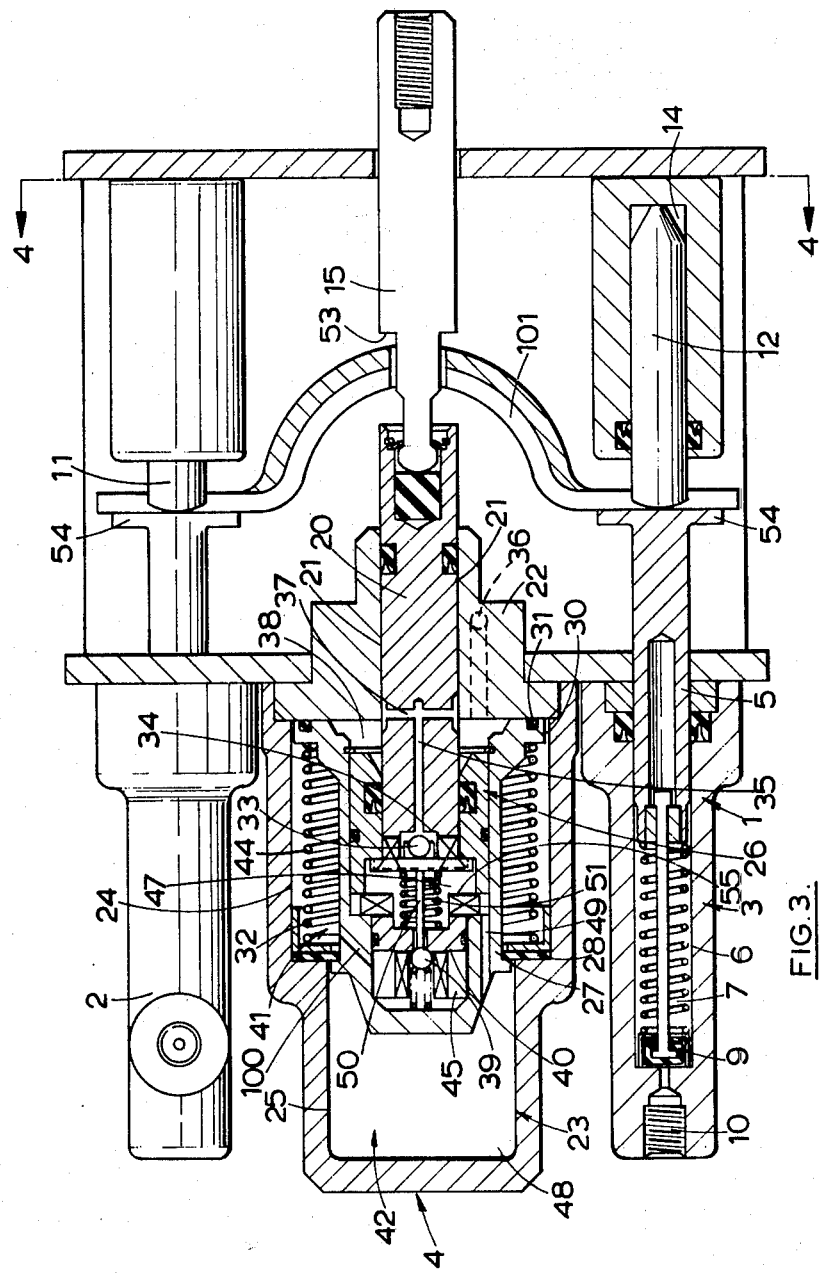
FIG. 3 is a section on the line 3—3 of FIG. 4.
Figure 4:
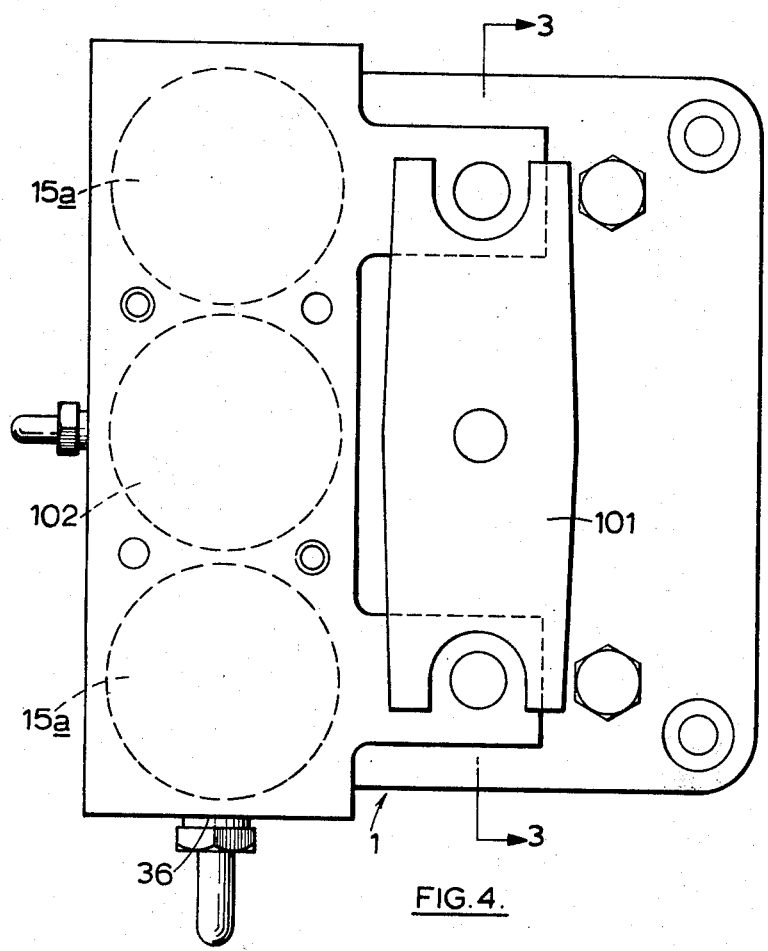
FIG. 4 is a section on the line 4—4 of FIG. 3.

The actuator assembly illustrated in the drawings comprises a housing 1 incorporating spaced parallel master cylinders 2 and 3 which are parallel with and spaced on opposite sides of a valve assembly 4.

Each master cylinder 2, 3 is of the hydrostatic type comprising a piston 5 working in an aligned bore 6 to pressurise fluid in a pressure space 7 in the bore which is supplied to a slave cylinder of a wheel brake through a port 8 after closure of a recuperation valve 9 leading to a reservoir port 10.

A pair of actuator pistons 11 and 12 work in bores 13 aligned axially with the bores 6 of the master cylinders 2, 3. Each actuator piston 11, 12 acts directly on a respective piston 5 through an opening in an arm of a mechanical transmission member 101 through which a two-part pedal-operated valve actuating member 15 also projects.

For normal actuation of the master cylinders 1 and 2 to apply the brakes each actuator piston 11, 12 is advanced in its bore 13 by pressurisation of a pressure space 14 at the end of the bore 13 which is remote from the master cylinder 2, 3, under the control of a solenoid-operated control valve 15a of known type located in the housing 1 and operable in response to deceleration of a wheel braked by that brake. Normally each valve 15a is open so that an inlet port 16 is connected to a conduit for high pressure fluid is in communication with the pressure space 14 through a passage 17. A third solenoid valve 102 connects an outlet port 18 to brakes on other wheels.

The inner part of the valve actuating member 15 comprises a piston 20 which works through a bore 21 in a closure 22 for one end of a blind bore 23 of stepped outline having a bore portion 24 of greater diameter located between the bore 21 and a bore portion 25 of smaller diameter. A hollow piston 26 of stepped outline has a portion 27 of smaller diameter which works through a radial seal 28 clamped against a shoulder 29 at the step in diameter of the blind bore 23, and a portion 30 of a greater diameter but less than that of the bore portion 24 to define a clearance therebetween. Normally a face seal 31 in the end wall of the portion 30 is urged into sealing engagement with the closure 22 by means of a compression spring 32.

The piston 20 forms part of a booster valve assembly which also includes an exhaust valve member 33 housed in a chamber in the inner end of the piston 20 and engageable with a seating 34 at the inner end of an axial passage 35 which communicates with an outlet port 36 in the closure 22 for connection to a reservoir for a supply of pressure fluid through radial ports 37 and an annular space 38 between the piston 20, the closure 22 and the piston 26. In addition the booster valve assembly comprises an inlet valve member 39 for engagement with seating 40 disposed between a first chamber 41 connected to supply of fluid under pressure conveniently a pump, through a radial inlet connection and a second chamber 42 which is sealingly isolated from the first by the seal 28 when valve 39 is in engagement with the seating 40.

The second chamber 42 is connected to the inlet ports 16 of both solenoid operated valves 15a through an external conduit 43.

The first chamber 41 comprises a first compartment 44 defined between the piston 26, the bore portion 24 and the closure 22, and a second compartment 45 with the piston 26, defined between the inner end thereof and the seating 40 and in permanent communication with the first compartment 44 through a passage 100 in the wall of the piston 26.

The second chamber 42 comprises a third compartment 47 located in the piston 26 between the exhaust valve seating 34 and the inlet valve seating 40, and a further fourth compartment 48 comprising the bore portion between the piston 26 and the closed inner end of the bore 23 and in permanent communication with the third through a longitudinal passage 49 in the piston 26.

In an inoperative off position of the brakes with the valve actuating member 15 in the retracted position shown the exhaust inlet valve member 33 is spaced from its seating 34 so that the second chamber 42 and the pressure spaces 14 are exhausted to reservoir and the inlet valve member 39 engages with its seating 40 to isolate the two chambers 41 and 42 from each other.

When the valve actuating member 15 is advanced to apply the brakes, the exhaust valve member 33 engages with its seating 34 and the actuating member 15 then acts through a thrust member 50 against the loading in a return spring 51 to urge the valve member 39 away from the seating 40. A metered supply of high pressure fluid then enters the chambers 4 from the chamber 41 and is supplied to the pressure spaces 14 to operate the master cylinders 1 and 2 and actuates brakes from the outlet ports 18 and 8. Obviously the greater the applied force on the actuating member 15 the greater will be the movement of the inlet valve member 39 and the greater will be the pressure in the second chamber 42 and the pressure spaces 14.

The pressure fluid in the second chamber 42 acts on the inner end of the piston 20 to resist movement of the piston 20 into the compartment 47. Thus the greater the pressure in the chamber 42 the greater will be the resistance to inward movement of the piston 20. The maximum distance by which the piston 20 can move with the supply of pressure operative is insufficient for a shoulder 53 on the actuating member 15 to engage with the transmission member 101

The piston 26 is subjected to a net force at all times which is sufficient to urge the portion 30 into sealing engagement with the closure 22 irrespective of the relative pressures in the chambers 41 and 42.

In the event of failure of the source of high pressure fluid resistance to movement of the actuating member 15 disappears so that the shoulder 53 can engage with the transmission member 101, in turn acting on the pistons 5 of the master cylinders 1 and 2 through enlarged heads 54 at their inner ends.

Also the actuating member 15 can engage with a shoulder 55 in the piston 26 to urge the piston 26 away from the closure 22 against the force in the spring 32. This ensures that any fluid which may be trapped in a compartment or passage is relieved to reservoir through the clearance between the piston portion 30 and the bore portion 24 and the space 38.

In the construction described above, since the master cylinders 1 and 2 are fixed in the housing 1 on opposite sides of the valve assembly 4, the master cylinders cannot move bodily. Thus flexible connections between the reservoirs and the wheel brakes, are not necessary.

I claim:

1. A power-operated actuator assembly for a vehicle hydraulic braking system comprising a housing having a pressure space and a power chamber, a reservoir for fluid, an outlet port in said housing through which said pressure space can be connected to a wheel brake, a piston for controlling generation of pressure in said pressure space, means supplying booster fluid to said power chamber to operate said piston, booster valve means for controlling said supply of booster fluid to said power chamber, said booster valve means including a pedal-operated valve actuating member comprising means for applying an applying force manually to said piston in the event of a failure in said supply of booster fluid, pressure responsive stop means in said housing for preventing said valve actuating member from being advanced through a distance sufficient to transmit a force to said piston at least when said supply of booster fluid is operative, said housing further including a pair of first and second sealingly isolated chambers, connecting means for connecting said first chamber to a supply of fluid under pressure, said booster valve means including exhaust valve means which is normally open for connecting said second chamber to said reservoir and inlet valve means which is normally closed for providing a connection between said pair of chambers, said stop means including means closing said exhaust valve means to isolate said second chamber from said reservoir and means opening said inlet valve means to supply a metered proportion of fluid under pressure to said second chamber to oppose movement of said actuating member in said operating direction, wherein a member which is separate from said housing and movable in said housing divides said housing into two portions and includes means allowing communication between said portions on movement of said member to relieve any pressure which may be trapped in either of said pair of chambers upon failure of said supply of fluid under pressure, and said member comprises a stepped piston having a first portion of smaller area and a second portion of greater area, said housing having a stepped bore in which said stepped piston is located and said bore having an end wall through which said actuating member projects, a first bore portion of smaller area in which said first piston portion works and a second bore portion of greater area in which said second piston portion is movable with a clearance fit, said second piston portion normally having a sealing engagement with said end wall, said stepped piston having a blind axial bore in which said projecting part of said actuating member is in a working fit, said first chamber comprising a first compartment between said stepped piston and said second bore portion in permanent fluid communication with a second compartment defined between the inner end of said blind bore and said inlet valve means, and said second chamber comprising a third compartment defined in said blind bore between said inlet valve means and said exhaust valve means and in a permanent fluid communication with a fourth compartment defined between said stepped piston and a closed inner end of said stepped bore.

2. A power-operated actuator assembly as claimed in claim 1, including a face seal in the end wall of said second piston portion, compression spring means normally biassing said face seal into engagement with said end wall of said second bore portion, and a radial seal through which said first piston portion works, clamping means clamping said radial seal against the step in diameter between said first and second bore portions.

3. A power-operated actuator assembly for a vehicle hydraulic braking system comprising a housing having a pressure space, a power chamber, an outlet port through which said pressure space can be connected to a wheel brake, and an inlet port for connection to a source of high pressure fluid, a first piston for controlling generation of pressure in said pressure space, means for supplying high pressure fluid to said power chamber from said inlet port to operate said piston, booster valve means for controlling said supply of booster fluid to said power chamber from said inlet port, a pedal-operated valve actuating means for operating said booster valve means and for applying an applying force manually to said piston in the event of a failure in said supply of booster fluid, and pressure responsive stop means in said housing for preventing said valve actuating means from being advanced through a distance sufficient to transmit a force to said piston at least when said source of high pressure fluid is operative, wherein said stop means comprises a second differential piston located in a stepped bore in said housing and comprising a first portion of smaller area and a second portion of greater area, said stepped bore having a first bore portion of smaller area in fluid communication with said power chamber, a second bore portion of larger area in communication with said inlet port, and a stop face at the end of said second bore portion which is remote from said first bore portion, and said differential piston having a pressure-responsive face defined by a shoulder at a step between said first portion and said second portion of said differential piston, a chamber defined between an end of smaller area of the differential piston and the first bore portion and in fluid communication with said power chamber, said differential piston an end of larger area for engagement with said stop face, first and second sealing means between said differential piston and said housing relatively spaced axially and so constructed and arranged that a compartment in communication with said inlet port is defined in said bore between said differential piston and said first and second sealing means and said end of larger area is urged into engagement with said stop face by a force of the pressure in said compartment acting over the area of said pressure-responsive face, pressurization of said power chamber by operation of said booster valve means also exposing said end of said differential piston which is of smaller area to pressure of said booster fluid to augment said force which urges said end of larger area into engagement with said stop face, and wherein said first sealing means comprises a face seal in said larger end of said differential piston for engagement with said stop face, and a compression spring acts on said differential piston normally to urge said face seal into sealing engagement with said stop face.

4. An actuator assembly as claimed in claim 3, wherein said second sealing means comprises a radial seal through which works a portion of said differential piston of an area equal to the area of said end of smaller area, and clamping means are provided for clamping said radial seal against a shoulder at the step in diameter between said first and second portions.

5. An actuator assembly as claimed in claim 3, wherein said valve actuating means comprises a first member for operating said booster valve member, and a second member associated with said first member for acting on said first piston only upon failure of said high pressure fluid.

6. An actuator assembly as claimed in claim 5, wherein said second member is external of said housing and is independent of said stop means and said booster valve means.

* * * * *